United States Patent [19]

Hogan

[11] Patent Number: 4,781,792

[45] Date of Patent: Nov. 1, 1988

[54] METHOD FOR PERMANENTLY MARKING GLASS

[76] Inventor: James V. Hogan, 323 Sapphire, Balboa Island, Calif. 92662

[21] Appl. No.: 731,662

[22] Filed: May 7, 1985

[51] Int. Cl.$^4$ .................... B44C 1/22; C03C 15/00
[52] U.S. Cl. ......................... 156/663; 156/631
[58] Field of Search ............... 156/659.1, 663, 631, 156/630; 252/79.3

[56] References Cited

U.S. PATENT DOCUMENTS

| 95,617 | 10/1869 | Strauss | 156/663 |
|---|---|---|---|
| 154,032 | 8/1874 | Frederici | 156/663 X |
| 1,832,716 | 9/1930 | Lopez | 156/663 |
| 2,067,925 | 1/1937 | Kennedy | 156/663 X |
| 2,127,781 | 8/1938 | McKay | 156/663 X |
| 2,162,590 | 6/1939 | Richter et al. | 156/663 X |
| 2,324,694 | 7/1943 | Gustkey | 156/663 |
| 3,769,113 | 10/1973 | Gruenke, Jr. | 156/663 X |
| 4,316,766 | 2/1982 | Levin et al. | 156/663 |
| 4,436,776 | 3/1984 | Wojcik | 156/663 X |
| 4,585,514 | 4/1986 | Scallan | 156/663 X |

FOREIGN PATENT DOCUMENTS

| 116492 | 1/1943 | Australia | 156/663 |
|---|---|---|---|
| 0726594 | 12/1966 | Italy | 156/663 |
| 0003268 | 8/1876 | United Kingdom | 156/663 |
| 1302796 | 1/1973 | United Kingdom | 156/663 |

OTHER PUBLICATIONS

Merriam-Webster New Collegiate Dictionary, G & C Merriam Co., Springfield, Mass., 1977, p. 92.

Primary Examiner—Michael W. Ball
Assistant Examiner—Ramon R. Hoch
Attorney, Agent, or Firm—Christie, Parker & Hale

[57] ABSTRACT

A process for etching a glass surface employing a mask film comprising a porous support layer having a resist area impervious to a glass etchant composition and non-resist areas pervious to the glass etching composition. The glass surface to be etched is cleaned and wetted with a basic aqueous solution. The backside of the mask is applied to the wetted glass surface and squeeged thereon to form a film of the basic aqueous solution to detachably secure the mask to the glass surface. The glass etchant composition is applied to the face of the mask to cover all the non-resist areas to etch the underlying glass. After the glass has been etched to the desired degree, the mask together with substantially all of the glass etchant composition is removed from the glass surface. The surface of the glass is then washed with the aqueous basic solution to remove any residual glass etchant composition.

18 Claims, 1 Drawing Sheet

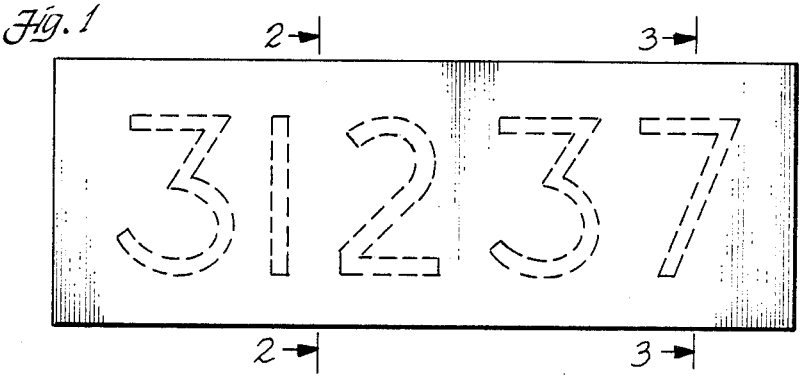
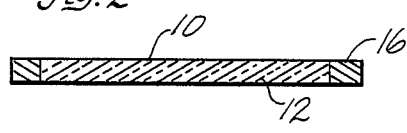
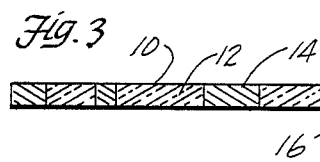
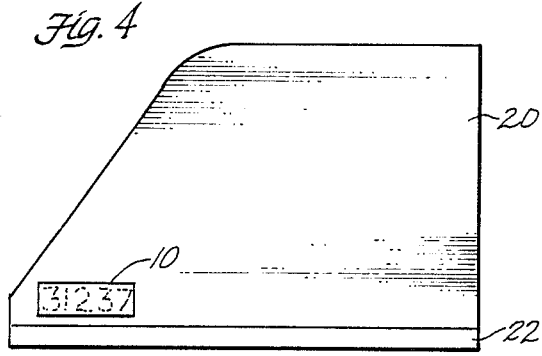
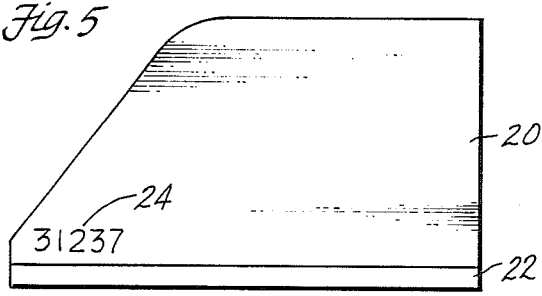

METHOD FOR PERMANENTLY MARKING GLASS

BACKGROUND OF THE INVENTION

This invention relates to a method of applying permanent markings to glass surfaces for purposes of design and identification. The application of permanent markings to glass surfaces is useful for tracing goods, inventorying goods, locating and identifying lost goods and preventing or inhibiting the theft of goods, such as, television sets, automobiles, microwave ovens, furniture with glass components, glass art objects, and the like.

Glass is an amorphous material composed principally of silicon dioxide and alkaline metal oxides. Glass is optionally compounded with other oxides such as boron oxide, lead oxide, zinc oxide, aluminum oxide, alkaline earth metal oxides and the like. Because of glass' chemical makeup and amorphous structure, it is difficult to a permanently mark glass. Conventional means of marking glass comprise engraving, printing or painting, chemical staining and etching. Decals can be placed on glass with the use of a suitable adhesive. However, decals are not permanent markings and can be easily removed by scraping or by dissolving the adhesive with an appropriate solvent. Glass can be engraved with a diamond or carbide tip stylist, engraving tool or the like. Engraving is difficult and requires a skilled artisan to obtain aesthetically acceptable engravings. Engraving has one additional drawback, if the engraving is not done properly, the glass can crack or shatter.

For over a century, it has been known that glass can be etched with hydrogen fluoride. It is believed that the hydrogen fluoride reacts with the silicon dioxide in the glass to form fluosilicic acid and silicon tetrafluoride. There is an equilibrium between fluosilicic acid and silicon tetrafluoride and water. The silicon tetrafluoride, being gaseous, escapes from the glass shifting the equilibrium and causing the fluosilicic acid to decompose into silicon tetrafluoride and water to maintain the chemical equilibrium. The conventional methods of etching glass comprise coating the glass with material resistant to hydrogen fluoride, such as wax or asphaltum, engraving a design in the coating down to the surface of the glass and applying either gaseous hydrogen fluoride or a solution of hydrogen fluoride to the exposed portion of the coated glass surface. The hydrogen fluoride etches the exposed glass surface. The glass surface coated with asphaltum is not etched. After the glass has been etched, the glass is washed and the protective coating is removed by heat treatment, scrapping and/or with an appropriate solvent.

This method of etching glass is extensively used in large scale manufacturing operations employing skilled personnel to engrave or cut out the design in the protective coating and who appreciate the danger of hydrogen fluoride. Normally, the etching takes place in large tanks where the surface of the glass to be etched can be placed in a horizontal or vertical position. This method is not amenable to home use or appliance stores, automobile dealers or art dealers for applying permanent identification marks or other markings to glass articles and articles containing glass components. Use of the above method is limited by (1) the danger and difficulty of handling hydrogen fluoride containing materials; (2) the skill required to engrave or cut out a design in the protective coating on the glass; and (3) the difficulty of applying a hydrogen fluoride-containing composition to a vertical surface, such as an automobile window.

The above difficulties have been recognized for over a century and a number of patents have issued relating to the etching of glass and metals to overcome these difficulties.

U.S. Pat. No. 95,617 teaches a way of eliminating the difficulty in engraving a design in the protective coating. This patent is directed to a process wherein lead letters are laid on top of a glass surface in a horizontal position and the glass is coated with a protective coating around the lead letters. The lead letters are removed exposing the glass surface in the design of the letters. This glass surface is etched by applying a hydrogen fluoride solution.

U.S. Pat. No. 1,832,716 is directed to a method of etching glass which eliminates the step of engraving or cutting out the design in the protective surface. The process comprises applying a sheet of glass over a pattern of the design to be etched on a flat horizontal surface. A protective coating resistant to hydrogen fluoride is applied to the portions of the upper surface of the glass not covering the pattern of the design to be etched. The glass is then sequentially etched in one or more steps to give the final etch design a three dimensional aspect. After the final etching, the glass is washed, the protective coating is removed and the etched side of the glass is given a mirrored coating. U.S. Pat. No. 2,067,925 discloses a paste etching composition for etching glass either by printing or transfer method. The composition contains magnesium carbonate, sugar, catechu or gum senegal, corn starch, semi-refined molasses, water, gum tragacanth, ammonium bifluoride, carbon black and oil of rose geranium.

U.S. Pat. No. 2,127,781 discloses a glass etching process similar to a silk screening operation. The silk screen is coated with an acid resistant material to form a stencil. The silk screen is placed in a silkscreen frame, contacted with the surface of the glass to be etched and a pasty, but not tacky consistency, composition is screened by means of a squeegee or roller through the interstices of the "open" areas of the silkscreen to etch the glass. After the etching is complete, the silkscreen is removed and the glass is washed three times with water. The patent discloses that the etching composition is to be devoid of crystals of ammonium bifluoride. The patent suggests the following etching composition. Seven pounds of ammonium bifluoride and five pounds of cryolite are added to nine pounds of water and the resulting mixture is boiled. The mixture is then allowed to cool to room temperature with stirring. The crystalline free mixture is decanted from any crystals and mixed with one pound of tragacanth gum. The resulting mixture is beat or whipped to form a pasty mass suitable for etching.

U.S. Pat. No. 2,324,694 discloses a method of engraving or cutting out a design in the acid resistant protective coating on a glass surface for preparation for etching. The glass surface is coated on both sides with the protective coating. The glass surface to be etched is then illuminated on the opposite side and an opaque stencil with desired design cut out of the stencil, is interposed between the illumination source and the surface to illuminate the design on the coated surface. The design illuminated on the protective coating is cut out of the protective coating down to the surface of the glass. The exposed glass surface is etched in a conventional manner.

U.S. Pat. No. 3,769,113 discloses a method to deep etch a glass surface. An emulsion of an elastomer is applied to the back side of the glass, that is, the side of the glass that is not to be etched. The elastomer is allowed to dry and then both sides of the glass are coated with a protective coating, such as asphaltum. The side of the glass to be etched is coated with asphaltum in the form of a pattern or a design. The plate is etched in a strong hydrogen fluoride solution with the surface to be etched facing downward to obtain a deep etching action.

U.S. Pat. No. 4,316,766 is directed to a method for applying identification designs on a glass surface. The method comprises forming a stencil from a flexible plastic foil or film perforated by electrostatic means to form a design. Glue or adhesive is applied to back side of the stencil and the stencil is applied to the glass surface to be etched. A paste-like glass etching composition containing ammonium bifluoride is applied to the other side of the stencil to etch the glass and impart the stencil design.

Australian Pat. No. 116,492 (1/21/43) is directed to a bituminous coated stencil for the acid etching of metal surfaces. The stencil comprises a backing sheet onto which is printed or silkscreened a design with a resin not appreciably soluble in a hydrocarbon solvent. Before the resin dries, the resin can be coated with aluminum powder if desired. After the resin has dried, an adhesive soluble in a hydrocarbon solvent is applied to the face of the stencil. The stencil, adhesive face down, is applied to the metal surface to be etched and then the backing sheet is removed leaving the resin stencil on the surface of the metal. The stencil therein is then washed with a solvent to remove the adhesive material not covered by the resin of the stencil. The metal is then etched, washed and the stencil removed to leave an etched design in the metal. In a preferred embodiment, a composition of wax and/or bitumin and/or rosin is applied to the resin side of the stencil. This composition acts as an adhesive material when contacted with a methylated solvent.

British Pat. No. 1,302,796 (1/10/73) is directed to a dry transfer glass etching method. An etching paste is applied to the intaglio areas of an engraved design. Transfer tissue is applied to the engraved design to transfer the paste in the engraved design on to the tissue. The tissue with the paste design is dried. When it is desired to etch glass with the design, the tissue is moistened and applied to a glass surface. Before the moist tissue is applied to the glass surface, a light coating of oil is applied to the glass surface to prevent glass hazing during etching. The etching paste is prepared from ten parts of ammonium bifluoride to one part of a thickening agent with sufficient water to form the paste.

SUMMARY OF THE INVENTION

The process of the present invention is directed to a method of permanently marking a glass surface by etching the desired marking in the glass surface. The process comprises (a) applying a basic aqueous cleaning solution to a glass surface to be etched;

(b) applying the basic aqueous cleaning solution to the backside of a mask having resist areas impervious to a glass etchant and nonresist areas that are porous to a glass etchant said resist areas and nonresist areas in combination delineating a marking pattern;

(c) applying the backside of the mask to the wetted glass surface whereby the basic aqueous cleaning solution forms a thin adhesion film detachably binding the mask to the glass surface;

(d) applying to the non-resist areas of the mask a glass etchant, the glass etchant permeating the non-resist areas of the mask to etch the glass surface to form an etched pattern substantially identical to the marking pattern; and (e) removing the mask from the glass surface and applying a basic aqueous neutralizing solution to the glass surface to neutralize the glass etchant adhering to the glass surface.

The mask comprises a porous support layer, permeable to the glass etchant composition, impregnated with a resist material impervious to the glass etchant composition that renders the mask impervious to the glass etchant composition. The porous support layer in the non-resist areas of the mask being substantially free (at least 90% by volume free) of the resist material. The resistant material is a soft, pliable, sherable material that can be readily removed from the porous support layer to form non-resist areas on the mask. Preferably, the resistant material can be removed from the porous support layer with moderate pressure or force, such as the force applied by a stylist or a typewriter type, typewriter ball, typewriter daisy wheel or dot matrix printer. Preferably a backing sheet of newsprint, paper or the like is positioned on the backside of the mask when a design or pattern is drawn, typed or printed on the mask to hold any resist material removed from the mask during the drawing, typing or printing operation. The packing paper can be used as a record of the design or pattern when the imprinting device is inked. In the preferred embodiment of the invention, the resistant material is inert to the glass etchant composition.

The thin adhesion film formed by the basic aqueous cleaning solution between the mask and the glass is very thin and binds the mask to the glass surface to bring the back surface of the mask and the surface of the glass close together to prevent seepage or diffusion of the glass etchant into the space between the glass surface and the back surface of the mask underlying the resist areas of the mask. The basic composition of the adhesion film neutralizes any fluids or gases from the glass etchant composition that seep or diffuse into the adhesion film. Thus, this process provides a means of etching glass whereby the etched design is in very close registration with the delineated marking pattern in the mask.

Preferably, the basic aqueous cleaning solution cleans and wets the glass surface. A clean glass surface assists in the attainment of a uniform etching action and uniform binding of the mask to the glass surface. However, it has been found that satisfactory etching can be achieved even if the glass is not cleaned before application of the mask. The small amount of basic aqueous cleaning solution underlying the non-resist areas of the mask is quickly and completely neutralized by the glass etchant which is present on the face of the mask in amounts far in excess of the amount needed to neutralize such aqueous solutions.

The glass etchant is preferably compounded in the form of a thick viscous liquid or paste to prevent the flow of the etchant off the mask, such as when the glass surface to be etched is a vertical surface or an overhead surface. A number of conventional glass etchant compositions may be employed in the present process, including the glass etchant compositions disclosed in the above-described U.S. Pat. Nos. 2,067,925 and 2,127,781 and U.K. Pat. No. 1,302,796.

The etching reaction time is dependent upon the glass etchant composition, the reaction temperature, and the degree or depth of etching required or desired. For shallow etchant designs or identifications, such as a few hundredths inches in depth, when employing a glass etchant such as described in U.S. Pat. No. 2,127,781 a etchant time of about three minutes at 70° F. to 80° F. is satisfactory; at 50° F. or lower, the etchant reaction occurs at a very slow rate and at a temperature above 90° F., the etchant reaction will be satisfactorily completed within one minute or less.

After the glass etching is completed to the degree desired, the mask together with substantially all of the glass etchant, which adheres to the mask, is easily pulled away from the glass surface. Preferably, the area of the glass surface underlying the mask is then wiped with a sponge, small towel or paper towel wetted with a basic aqueous solution to neutralize and remove any residual glass etchant composition. It has been found, that this latter step promotes the sharpest etch design because it eliminates further etching.

BRIEF DESCRIPTION OF THE DRAWINGS

FIG. 1 is a plane view of the mask employed in the process of the present invention;

FIG. 2 is a cross-sectional view of the mask taken along lines 2—2 of FIG. 1;

FIG. 3 is a cross-sectional view of the mask of FIG. 1 taken along lines 3—3;

FIG. 4 is a plane view illustrating the application of a mask of FIG. 1 on a side window of an automobile; and FIG. 5 is a plane view of a side window of an automobile of FIG. 4 permanently marked with the design of the mask of FIG. 1.

DETAILED DESCRIPTION OF THE INVENTION

In FIG. 1, a mask 10 is illustrated. The mask 10 has a resist portion or area 12 and a non-resist area 14. The resist area 12 and the non-resist area 14 delineate a marking pattern: "31237". The resist area 12 is resistant to the action of a glass etchant composition and is impervious to such composition. The non-resist area 14 is pervious to a glass etchant composition and the active components of a glass etchant composition will permeate through the area.

As shown in FIG. 2 and FIG. 3, the mask 10 comprises a porous support layer 16 impregnated with a resist composition impervious to and resistant to the glass etchant composition. The resist area 12 comprises the porous support layer 16 impregnated with the resist composition. The non-resist area 14 of the mask 10 consists of the porous support layer 16 and is essentially free of the resist composition.

The porous support layer 16 can be paper, synthetic or natural fiber, fabric, mesh or screen, or it can be a porous non-fabric paper or synthetic polymeric material. The porous support layer 16 has sufficient porosity to permit permeation of the active components of the glass etchant composition therethrough. The porous support layer 16 comprises a material resistant to attack by the glass etchant composition, preferably the layer is inert to the etchant composition.

The resist composition, which is impervious to the glass etchant composition, can be coated on the surface of the porous support layer 16, preferably it is impregnated into the layer 16. The resist composition can be a natural or synthetic wax, such as bees wax, paraffin wax, polyethylene based wax, or the like, asphaltum, bitumen, or a soft waxy polymeric material. Preferably, the resist composition is a soft, pliable and shearable material that can be readily removed from the porous support layer 16 with moderate pressure or force, such as the pressure or force exerted by a stylist or the type of a telex machine, conventional strike-bar typewriter, ball-type typewriter, daiseywheel typewriter or dot matrix printer. Preferably a porous support layer material is selected that has sufficient strength to resist tearing or shearing by the action of a stylist or the type of a typewriter. For the purposes of the present invention, it has been found that the conventional stencil material used in the mimeograph type or brand reproduction can be readily used. The mimeograph type stencil with a backing sheet can be placed in a typewriter and the desired pattern, such as an identification code, serial no. or the like is typed on the stencil. The type or typing head of the typewriter or printer displaces and shears the resist composition from the porous support layer 16 leaving the layer 16, where typed or printed, substantially free of the resist material. The typed or printed stencil, when complete, comprises a non-resist area 14 substantially free of resist composition (such as, at least 90% by weight free of resist composition) and a resist area 12 impregnated with the resist composition. The resist area 12 and non-resist area 14 delineate the desired marking pattern typed on to the stencil as illustrated in FIG. 1.

A marking pattern is applied to the glass surface by first wetting the glass surface with a basic aqueous cleaning solution. The cleaning solution is conveniently applied by wiping the surface with a sponge, a cloth or a paper towel wetted with the solution. The basic aqueous cleaning solution performs two functions: It cleans the surface of the glass and wets the surface of the glass. If the glass surface has been exposed to a great deal of dirt, grime or grease, more than one application of the basic aqueous cleaning solution may be required to clean and wet the glass. If the glass has been coated with a polyglycolate coating, such as the protective coatings applied to automobiles, the glass is preferably cleaned with acetone before the glass is permanently marked as described herein.

The basic aqueous cleaning solution comprises water and an alkali metal salt of a weak acid. Ammonium hydroxide or ammonia salts also may be utilized. The cleaning solution may incorporate surface-active components such as cationic, anionic or nonionic detergents to enhance the wetting action of the solution. The solution may, in addition, contain water soluble alcohols, ethylene glycol, glycerol, low molecular weight water soluble polyethylene glycols, and/or water soluble keytones such as acetone and/or methylethylkeytone. Viscosity modifiers such as gums may also be added to the cleaning solution to thicken the solution to minimize splattering and running of the solution when it is applied to a overhead or vertical surface.

Optionally, but preferably, a basic aqueous neutralizing solution is applied to the backside of the mask. If the resist composition is hydrophobic, the back surface of the mask may not be evenly wet by the solution. The mask is applied with its backside positioned against the wetted surface of the glass. The mask is rubbed, squeegeed or rolled against the surface of the glass to remove air bubbles trapped beneath the mask and to bind the mask to the glass surface. A film of basic aqueous cleaning solution binds the mask to the glass surface.

Preferably, the etching is completed before the film of basic aqueous solution has evaporated. When the etching is to be conducted in hot and/or dry conditions, chemicals may be added to the basic aqueous solutions to minimize evaporation of the solution, such as ethylene glycol, glycerol, and low molecular weight water-soluble polyethylene glycols, and/or gums such as tragacanth gum or the like.

After the mask has been applied to the surface of the glass, such as is illustrated in FIG. 4 which illustrates a side window 20 of an automobile having a base support 22. The mask 10 has been applied to the window 20. The glass etchant composition is applied to the non-resist areas of the mask from top side in a manner so that all the non-resist areas 14 are covered by the composition. Conveniently, the glass etchant is applied to the face of the mask covering most of the resist area 12 and all the non-resist area 14. Care is taken not to apply the glass etchant beyond the boarders of the mask 10 onto the glass where the etchant will etch the glass. The composition is rubbed, brushed, squeegeed or rolled into the non-resist area 14 in order to permeate the active components of the glass etchant through the porous support layer 16 and place it in contact with the glass surface to etch the glass. The reaction speed of the etchant reaction is dependent upon the temperature and the composition. Preferably, the etching composition is a thick pasty composition that will not flow from or off the mask when the mask is applied to a vertical or overhead surface.

The active ingredient of the etchant is hydrogen fluoride or a hydrogen fluoride containing salt. The composition can contain ammonium bifluoride (also known as ammonium hydrogen fluoride, acid ammonium fluoride); alkali metal bifluorides, hydrogen fluoride or a fluoride salt in combination with a strong acid, such as hydrochloric acid, sulfuric acid and the like. Preferably, and conveniently, the active ingredient is ammonium bifluoride alone or in combination with an alkali metal bifluoride. Preferably, the active ingredient is present in a non-crystalline form. If the crystals are large; they will not permeate through the porous support layer 16. Active materials in the crystalline form frequently do not give a uniform etching action because of the limited contact between the crystal and the glass surface. The etchant composition will comprise the active ingredient, sufficient water to give the composition a thick and viscous consistency or pasty consistency and, optionally, a thickening agent and/or an inert filler. Various gums can be used as thickening agents, such as tragacanth gum, acacia gums, xanthan gums and the like. Hydroxylated polyether based polymers, such as polyethylene glycols, and hydroxylated alkyl based polymers, such as polyvinyl alcohol, and water soluble polymeric materials, such as polyvinyl pyrolidene, may also be used as viscosity modifiers. Inert fillers can also be used to thicken the composition such as barium sulfate. The thickeners, viscosity modifiers and fillers are preferably resistant to or nonreactive with the active ingredient of the with the active ingredient of the glass etchant. If the etching is to be conducted under dry or hot conditions, materials, such as etheylene glycol, glycerol, and a low molecular weight water soluble polyethylene glycols can be added to inhibit evaporation of the water from the composition. When the desired degree of etching has taken place, the mask is peeled from the surface of the glass. Substantially all of the glass etching composition is retained on the mask and is removed from the glass with the mask. However, some of the glass etchant composition may remain in the etched-out areas of the glass upon removal of the mask. Accordingly, and preferably, the surface of the glass wherein the etchant operation took place, is wiped or washed with a basic aqueous neutralizing solution to neutralize any glass etchant composition adhering to the glass surface to prevent further etching and cleanout the etched-out areas of the glass. The basic aqueous neutralizing solution is similar to the basic aqueous cleaning solution and comprises water and an ammonium or alkali metal salt of a weak acid, and optionally, a detergent, a thickening agent, and/or a water soluble organic material. Conveniently, the basic aqueous cleaning solution, and the basic aqueous neutralizing solution are the same solution.

In an alternative embodiment of the present invention, glass is permanently marked by an etching process comprising the steps of:

(a) cleaning the glass;

(b) applying a dry mask to the glass;

(c) applying the basic aqueous cleaning solution to the front face or side of the mask to dampen the mask;

(d) squeegeeing the damp mask against the glass to eliminate air bubbles between the mask and glass and form a thin film of aqueous solution to bind the mask to the glass;

(e) applying a glass etchant composition operative to etch glass to the front face or side of the mask to cover all of the non-resist areas of the mask with the glass etching composition for a time operative for the glass etchant composition to etch the marking pattern in the surface of the glass; and (f) removing the mask from the glass surface.

In this embodiment, the glass can be cleaned mechanically, such as by wiping with a cloth or paper towel, wiping with an air jet or blast of pressurized air, brushing with a brush, or the like. Alternatively, the glass can be cleaned by applying water, glass cleaner or the basic aqueous cleaning solution to the glass and wiping the glass. If the glass is cleaned with water or an aqueous solution, the glass is wiped clean of the water or solution before the mask is applied to the glass.

The mask, back side down, is applied or laid on the glass and dampened with the basic aqueous cleaning solution. The solution can be sprayed on or wiped on with a sponge, brush, cloth or paper towel wetted with the solution. The mask can be conveniently held in place with one hand during this operation.

FIG. 5 illustrates a side window 20 of an automobile that bears the etched marking design 24 in the same location that the mask 10 was applied as illustrated in FIG. 4.

Although the present invention has been illustrated with reference to permanently marking a glass surface with an identification code, the process can be used to etch designs, pictures, lettering or the like to a glass surface.

The following examples will further illustrate the practice of the present invention. These examples are set forth for illustrative purposes only and are not intended and should not be contrued as limitations of the present invention.

EXAMPLE 1

Preparation of Basic Aqueous Cleaning Solution

Forty-six grams of sodium carbonate (dehydrated) are dissolved in one liter of water. Seventeen grams of ammonia are added and dissolved into the sodium carbonate solution. Thereafter the following ingredients are added to and dissolved in the aqueous solution sequentially: Joy brand dishwashing detergent, 2 grams; ethyl alcohol, 50 grams; and polyethylene oxide sorbitan mono-oleate (Polysorbate 80), 5 grams.

Preparation of Basic Aqueous Neutralizing Solution

One thousand grams of potassium carbonate ($K_2CO_3.2H_2O$) are dissolved in one liter of water heated to 80° C. The solution is allowed to cool to room temperature and filtered.

Preparation of the Glass Etchant Composition

Ammonium bifluoride is added to 500 ml of deionized water heated to 95° C. until saturation is reached. The resulting solution is allowed to cool to ambient temperature to form a clear solution and crystalline residue. The clear solution is decantered from the crystalline residue. The resulting solution is compounded with sufficient powdered barium sulfate (99% −200 mesh) to form a thick glass etchant composition paste, which can be brushed on to a mask positioned on a vertical surface without running.

Preparation of the Mask

Orange waxed tissue, a stencil material manufactured by Frismar, Inc., Clinton, Conn. is secured at one edge to a backing sheet of bond paper with the waxed surface of the stencil facing up. The stencil and the paper backing are typed with an automobile identification number of a 1974 Porsche to prepare six masks. The typewriter type removes the resist composition from the stencil in a defined pattern. The resist area and non-resist area of the resulting or masks delineated the automobile identification number.

Permanent Marking of Glass Surfaces

The exterior surface of the lower righthand corner of the windshield of the 1974 Porsche is wiped with a paper towel moistened with the basic aqueous cleaning solution prepared above. The basic solution is also applied to the backside of one of the six masks prepared above, and the mask, backside down, is applied to the wetted surface of the windshield. The face of the mask and the backside of the mask are easily distinguishable. The identification number reads "normally" left to right when viewed on the face of the mask and reads "backward" with the numbers and letters facing backward when viewed on the backside of the mask. The mask is squeegeed against the windshield by squeegeeing or pressing the mask against the windshield with a sponge. The glass etchant composition prepared above is applied to the face of the mask with a brush. Care is taken to prevent application of the chemical etching composition paste beyond the free face of the mask. The chemical etching composition paste is brushed into the non-resist areas of the mask. When the ambient air temperature is about 70° F. the mask and chemical etching composition paste are allowed to remain on the windshield for about three minutes. The mask is then peeled off the windshield. Substantially all of the chemical etchant composition remains with the mask. A towel moistened with the basic aqueous neutralizing solution is wiped over the etched area of the windshield to remove any residual glass etchant composition. The Porsche's identification number is clearly and uniformly etched into its windshield. The same operation is repeated on the four side windows and the rear window of the Porsche.

Satisfactory etchant times for various ambient temperatures are set forth below:

| Ambient Temperature | Etchant Time |
| --- | --- |
| less than 50° F. | 6 minutes or longer |
| 50°–60° F. | 5 minutes |
| 60°–70° F. | 4 minutes |
| 70°–80° F. | 3 minutes |
| 80°–90° F. | 2 minutes |
| 90°–100 F. | 1 minute |

EXAMPLE 2

For areas where the ambient air temperature is 90° F.+, the chemical etching composition of Example 1 can be compounded with sodium bifluoride which etches glass at a slower rate than ammonium bifluoride. In addition, the etching composition can be compounded with 10 grams tragacanth gum to inhibit evaporation of water from the composition at the elevated air temperatures.

EXAMPLE 3

The exterior surface of the lower right-hand corner of the left front side window (driver's window) of a 1972 Volkswagon 2-door sedan is wiped off with a soft, dry towel. A mask prepared beforehand with the automobiles identification number is applied, backside down, to the clean glass. The mask is dampened with a sponge applicator wetted with the basic aqueous cleaning solution of Example 1. The mask is squeegeed against the glass with a sponge applicator to remove air bubbles trapped beneath the mask. The glass etchant composition of Example 1 is brushed onto the face of the mask with a brush to cover all the non-resist areas. Etchant that inadvertently is brushed onto the glass is immediately removed with a paper towel wetted with the basic aqueous neutralizing solution to prevent etching of the glass. The mask with the etchant are allowed to remain on the glass for a sufficient time to etch the glass (see the etchant time schedule of Example 1). After the desired etchant time has elapsed, the mask with the adhering etchant composition is removed from the glass. A towel moistened with the basic aqueous neutralizing solution of Example 1 is wiped across the etched area of the glass to neutralize and remove any residual glass etchant. The window is permanently etched with the automobile's identification number. The operation is repeated on the remaining windows of the Volkswagon automobile.

What is claimed is:

1. A process for permanently marking a glass surface comprising the steps of:
   (a) wiping a glass surface with a basic aqueous cleaning solution;
   (b) wiping the backside of a mask having a face and a back side with the basic aqueous cleaning solution, said mask comprising a porous support layer permeable to a glass etchant composition and a resist material impervious to said glass etchant composition, said mask having resist areas impervious to a glass etchant composition where said porous support layer is impregnated with said resist material, and non-resist areas pervious to said glass etchant composition where said porous support layer is substantially free of said resist material, said resist areas and non-resist areas in combination delineating a marking pattern on the mask to be etched into the glass surfce;

(c) applying the back side of said mask to the wiped glass surface to bind the mask to said glass surface;

(d) applying a glass etchant composition operative to etch glass to the face of the mask to cover all of the non-resist areas of the mask with the glass etchant composition for a time operative for the glass etchant composition to etch the marking pattern into the surface of the glass; and (e) removing the mask from the glass surface.

2. The process according to claim 1 wherein a basic aqueous neutralizing solution is applied to the glass surface after the removal of the mask to neutralize any residual glass etchant composition adhering to the glass surface and prevent further etching.

3. The process according to claim 2 wherein the basic aqueous cleaning solution and the basic aqueous neutralizing solution are the same solution.

4. The process according to claim 1 wherein the glass etchant composition comprises a hydrogen fluoride source selected from the group consisting of ammonium bifluoride, lithium bifluoride, sodium bifluoride, potassium bifluoride, calcium bifluoride, a mixture of a fluoride salt and a strong acid, and mixtures thereof.

5. The process according to claim 1 wherein the glass etchant composition comprises ammonium bifluoride and water.

6. The process according to claim 1 wherein the mask is a waxed tissue stencil material comprising a tissue porous support layer, said tissue porous support layer having resist areas impregnated with wax and non-resist areas being substantially free of wax.

7. The process according to claim 1 wherein the mask is squeegeed on the glass surface after application of the mask to said glass surface, to form a thin film with said basic aqueous cleaning solution to bind said mask to said glass surface.

8. A process for permanently marking a glass surface comprising the steps of:

(a) preparing a mask having a face side and a back side, said mask comprising a porous support layer pervious to a glass etchant composition and a resist material impervious to said glass etchant composition, said support layer having resist areas impervious to said glass etchant composition, and non-resist areas pervious to said glass etchant composition, said porous support layer impregnated with said resist material impervious to said glass etchant composition in said resist areas, said porous support layer being substantially free of said resist material in said non-resist areas, said resist areas and non-resist areas in combination delineating a marking pattern to be etched into the glass surface;

(b) wiping a glass surface with a basic aqueous cleaning solution;

(c) wiping the back side of said mask with the basic aqueous cleaning solution;

(d) applying the back side of said mask to the wetted glass surface to bind said mask to said glass surface and to form a thin film of said aqueous solution between the glass surface and the back side of the mask to detachably bind said mask to said glass surface;

(e) applying to the face side of said mask a chemical etching composition operative to etch a glass surface, the glass etchant composition permeating the non-resist areas of the mask to etch the glass surface to form an etch pattern substantially identical to the marking pattern delineated by the resist and non-resist areas of the mask; and (f) removing the mask from the glass surface.

9. The process according to claim 8 wherein a basic aqueous neutralizing solution is applied to the glass surface after the removal of the mask to neutralize any residual glass etchant composition adhering to the glass surface to prevent further etching.

10. The process according to claim 8 wherein the mask is squeegeed on the glass surface after application of the mask to said glass surface, to form a thin film of said basic aqueous cleaning solution between said mask and said glass surface to bind said mask to said glass surface.

11. The process according to claim 8 wherein the basic aqueous cleaning solution comprises a salt selected from the group consisting of an alkali metal salt of a weak acid or an ammonia salt of a weak acid.

12. A process according to claim 8 wherein the basic aqueous cleaning solution comprises ammonia hydroxide.

13. A process according to claim 11 wherein the basic aqueous cleaning solution comprises, in addition, a surface active agent selected from the group consisting non-ionic detergents, anionic detergents, cationic detergents, and mixtures thereof.

14. The process according to claim 8 wherein the the basic aqueous neutralizing solution comprises an aqueous solution of an alkali metal salt of a weak acid.

15. The process according to claim 8 wherein the glass etchant composition comprises a hydrogen fluoride source selected from the group consisting of ammonium bifluoride, lithium bifluoride, sodium bifluoride, potassium bifluoride, calcium fluoride, a mixture of a fluoride salt and a strong acid and mixtures thereof.

16. The process according to claim 8 wherein the glass etchant composition comprises ammonium bifluoride.

17. The process according to claim 8 wherein the mask is a waxed tissue stencil material comprising a tissue porous support layer, said tissue porous support layer having resist areas impregnated with wax and non-resist areas being substantially free of wax.

18. The process according to claim 8 wherein the mask is squeegeed on the glass surface after application of the mask to said glass surface, to form a thin film with said basic aqueous cleaning solution to bind said mask to said glass surface.

* * * * *